United States Patent
Seol et al.

(10) Patent No.: US 10,498,806 B2
(45) Date of Patent: Dec. 3, 2019

(54) COMPUTER-EXECUTABLE SERVER LOAD MONITORING METHOD, APPARATUS PERFORMING THE SAME AND STORAGE MEDIUM STORING THE SAME

(71) Applicant: TEEMSTONE LLC, Pine Brook, NJ (US)

(72) Inventors: Chang Won Seol, Wayne, NJ (US); Bum Sik Lee, Seongnam-si (KR)

(73) Assignee: TEEMSTONE LLC, Pine Brook, NJ (US)

( * ) Notice: Subject to any disclaimer, the term of this patent is extended or adjusted under 35 U.S.C. 154(b) by 245 days.

(21) Appl. No.: 15/210,312

(22) Filed: Jul. 14, 2016

(65) Prior Publication Data

US 2018/0020048 A1    Jan. 18, 2018

(51) Int. Cl.
*H04L 12/26* (2006.01)
*H04L 29/08* (2006.01)

(52) U.S. Cl.
CPC .......... *H04L 67/1008* (2013.01); *H04L 43/04* (2013.01); *H04L 43/08* (2013.01); *H04L 43/0817* (2013.01); *H04L 67/1029* (2013.01)

(58) Field of Classification Search
None
See application file for complete search history.

(56) References Cited

U.S. PATENT DOCUMENTS

2014/0019623 A1* 1/2014 Takemura ............... H04L 47/70
                                                                    709/226
2014/0068608 A1* 3/2014 Kulkarni ............. G06F 9/45558
                                                                    718/1

FOREIGN PATENT DOCUMENTS

KR    10-0926362 B1    11/2009
KR    10-0994310 B1    11/2010

* cited by examiner

*Primary Examiner* — Joshua Joo
(74) *Attorney, Agent, or Firm* — Paratus Law Group, PLLC

(57) ABSTRACT

A computer-executable server load monitoring method is performed in a server load monitoring apparatus connected with at least one server. The server load monitoring method includes (a) measuring an average server load value and a maximum server load value during a monitoring period which may be defined from a reference time to a past specific time for each of the at least one server; (b) calculating a band ratio indicating an over performance guide frequency to sampling frequency ratio for the monitoring period based on a server performance guide; and (c) determining a server management policy based on the average server load value, the maximum server load value and the band ratio for each of the at least one server.

17 Claims, 6 Drawing Sheets

COMPUTER-EXECUTABLE SERVER LOAD MONITORING METHOD, APPARATUS PERFORMING THE SAME AND STORAGE MEDIUM STORING THE SAME

BACKGROUND

This disclosure relates to a server load monitoring technology and, more particularly, to a computer-executable server load monitoring method and apparatus capable of monitoring at least one server load based on a reference range which can be set by a user, and a storage medium storing the method.

A server connects a computer to a plurality of computers using a communication link to store information used in common or to collect programs that use many computer resources. Therefore, the server requires a process of periodically monitoring a server performance for preparing a server breakdown as many users use the server.

The existing technology used to analyze a log and profile information or select a performance indicator estimate model to measure a performance of the server.

Korean Patent Registration No. 10-0926362 discloses a server performance management method and system. According to the patent technology, there is provided a server performance management system, comprising n (an arbitrary natural number) servers configured to analyze at least one log and profile information for a plurality of hardware included and applications installed and generate factor data according to a predetermined method to store them in a database; and a performance management web-server configured to generate collection request information for factor data that are not stored in the database in factor data corresponding to items to generate an arbitrary report and transmit them to each server, wherein the each server analyzes the log and the profile information correspondingly to the collection request information and generate extension factor data according to a predetermined method to transmit them, wherein the performance management web-server generates a report according to a predetermined method using factor data extracted from the database and the extension factor data received. Accordingly, it may be possible to easily generate a report for a performance and a use situation for heterogeneous servers.

Korean Patent Registration No. 10-0994310 discloses a method and system for estimating a performance index of a web-server. According to the patent technology, the method may comprise extracting sample data to select a performance index estimation model from a web-server; selecting a performance index estimation model corresponding to a performance index according to resources of the web-server using a distribution of the extracted sample data; and determining parameters of the performance index estimation model to optimize the selected performance index estimation model.

SUMMARY

One embodiment of the present disclosure provides a computer-executable server load monitoring method capable of monitoring at least one server load based on a reference range that may be set by a user, an apparatus performing the same and a storage medium storing the same.

One embodiment of the present disclosure provides a computer-executable server load monitoring method capable of monitoring a server load through a band ratio indicating an over performance guide frequency to sampling frequency ratio during a monitoring period based on an average server load value, a maximum server load value and a server performance guide, an apparatus performing the same and a storage medium storing the same.

One embodiment of the present disclosure provides a computer-executable server load monitoring method capable of determining a server management method according to a grade of a performance guide, an apparatus performing the same and a storage medium storing the same.

In some embodiments, a computer-executable server load monitoring method is performed in a server load monitoring apparatus connected with at least one server. The method includes (a) measuring an average server load value and a maximum server load value during a monitoring period which may be defined from a reference time to a past specific time for each of the at least one server; (b) calculating a band ratio indicating an over performance guide frequency to sampling frequency ratio for the monitoring period based on a server performance guide; and (c) determining a server management policy based on the average server load value, the maximum server load value and the band ratio for each of the at least one server.

The step (a) may include determining a monitoring priority of the at least one server in a descending order of the average server load value. The step (a) may further include comparing differences between the average server load value and the maximum server load value to determine the monitoring priority.

The step (b) may further include setting a number and a reference range of a server performance guide reference based on the average server load value and the maximum server load value. The step (b) may further include setting a minimum value of the over performance guide frequency. The step (b) may further include determining an effectiveness of excess data according to whether the over performance guide frequency exceeds the set minimum value. The step (b) may further include determining the band ratio according to the following equation.

$$R = \frac{n - c_{\textit{eff}}}{T} * 100 \qquad \text{[Equation 1]}$$

(R: band ratio, n: the over performance guide frequency in a range of the period, $c_{\textit{eff}}$: the number of invalid data in the over performance guide frequency data, T: the number of total collection in the range of the period)

The step (b) may further include respectively calculating band ratios of selected at least one specific server, the band ratios corresponding to the set performance guide. The step (b) may further include calculating differences between the data immediately before the data corresponding to an over performance guide value and the over performance guide value and between the data immediately after the data corresponding to the over performance guide value and the over performance guide value, to determine that the differences are valid when the differences are below a specific difference. The step (b) may further include determining the step according to the following equation.

$$c_{\textit{eff}} = \left[\frac{1}{K}s|T_n - T_{n-1}|\right] * \left[\frac{1}{K}s|T_n - T_{n+1}|\right] \qquad \text{[Equation 2]}$$

($c_{\textit{eff}}$: the number of invalid data in the over performance guide frequency data, $T_n$: reference data corresponding to over performance guide frequency value, $T_{n+1}$, $T_{n-1}$: data immediately before and after the reference data, K: reference constant)

The step (b) may further include determining the reference data as the valid data when a result of the effectiveness determination is 0 and determining the reference data as the invalid data when the result of the effectiveness determination is 1 or more. The step (b) further includes counting the invalid data based on an effectiveness determination algorithm to calculate the band ratio, to exclude the counting number. The step (b) may further include calculating a band average corresponding to an average value for the data corresponding to the over performance guide frequency. The step (b) may further include indicating the calculated band ratio and band average in a single graph. The step (b) may further include determining a performance ranking for each server based on the calculated band ratio.

The step (c) may further include classifying the server management policy into a plurality of grades based on the average server load value, the maximum server load value and the band ratio corresponding to the performance guides. The step (c) may further include selecting a grade corresponding to the band ratio value from the plurality of grades. The step (c) may further include determining a final server management policy based on the selected grade of the performance guide.

In some embodiments, a server load monitoring apparatus comprises (a) a server load measuring unit configured to measure an average server load value and a maximum server load value during a monitoring period which may be defined from a reference time to a past specific time for each of the at least one server; (b) a band ratio calculating unit configured to calculate a band ratio indicating an over performance guide frequency to sampling frequency ratio for the monitoring period based on a server performance guide; and (c) a server management policy determining unit configured to determine a server management policy based on the average server load value, the maximum server load value and the band ratio for each of the at least one server.

In some embodiments, a storage medium stores a computer-executable server load monitoring method performed in a server load monitoring apparatus which is connected with at least one server. The computer-executable server load monitoring method comprises (a) measuring an average server load value and a maximum server load value during a monitoring period which may be defined from a reference time to a past specific time for each of the at least one server; (b) calculating a band ratio indicating an over performance guide frequency to sampling frequency ratio for the monitoring period based on a server performance guide; and (c) determining a server management policy based on the average server load value, the maximum server load value and the band ratio for each of the at least one server.

The disclosed technology may have following effects. However, since it does not mean that a specific embodiment should include all of only the effects, it should not be understood that the scope of the disclosed technology is limited thereto.

According to one embodiment of the present disclosure, a computer-executable server load monitoring method may monitor at least one server load based on a reference range that may be set by a user.

According to one embodiment of the present disclosure, a computer-executable server load monitoring method may monitor a server load through a band ratio indicating an over performance guide frequency to sampling frequency ratio during a monitoring period based on an average server load value, a maximum server load value and a server performance guide, an apparatus performing the same and a storage medium storing the same.

According to one embodiment of the present disclosure, a computer-executable server load monitoring method may determine a server management policy according to a grade of a performance guide.

DETAILED DESCRIPTION

Figure 1:
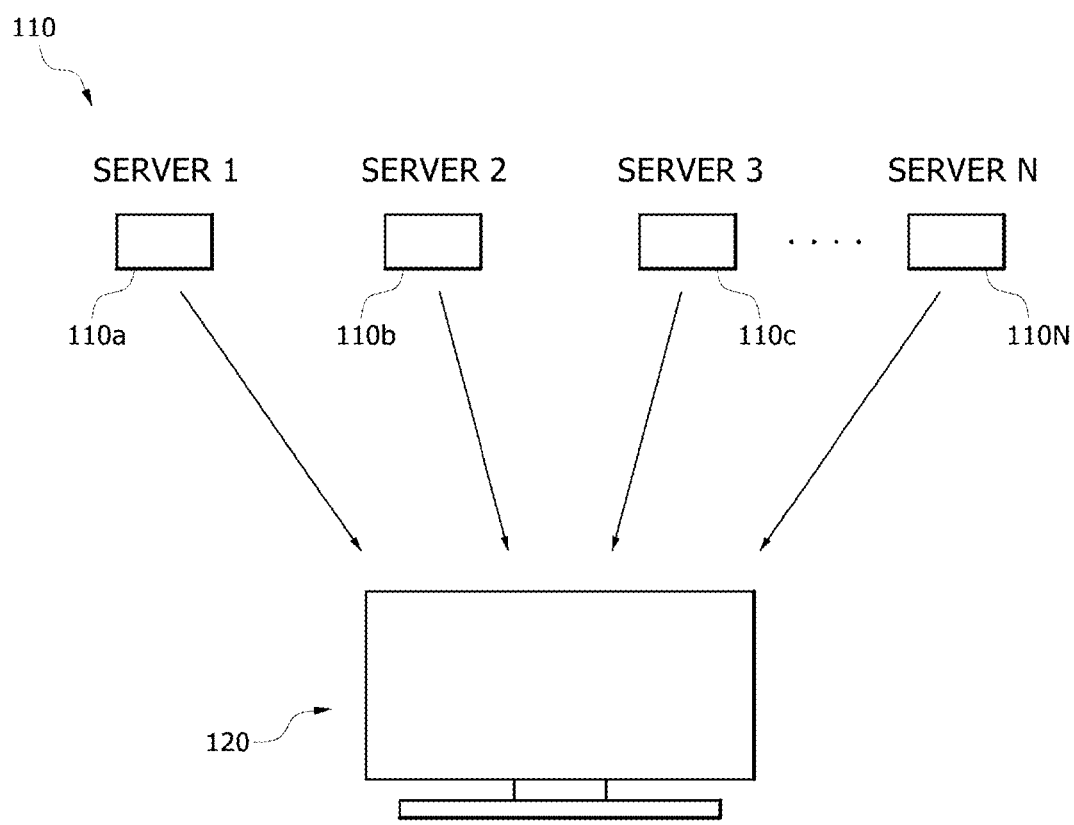
FIG. 1 is a diagram illustrating a server load monitoring system according to one embodiment of the present disclosure.

Explanation of the present disclosure is merely an embodiment for structural or functional explanation, so the scope of the present disclosure should not be construed to be limited to the embodiments explained in the embodiment. That is, since the embodiments may be implemented in several forms without departing from the characteristics thereof, it should also be understood that the described embodiments are not limited by any of the details of the foregoing description, unless otherwise specified, but rather should be construed broadly within its scope as defined in the appended claims. Therefore, various changes and modifications that fall within the scope of the claims, or equivalents of such scope are therefore intended to be embraced by the appended claims.

Meanwhile, terms described in the present disclosure may be understood as follows.

While terms such as "first" and "second," etc., may be used to describe various components, such components must not be understood as being limited to the above terms. The above terms are used to distinguish one component from another. For example, a first component may be referred to as a second component without departing from the scope of rights of the present disclosure, and likewise a second component may be referred to as a first component.

It will be understood that when an element is referred to as being "connected to" another element, it can be directly connected to the other element or intervening elements may also be present. In contrast, when an element is referred to as being "directly connected to" another element, no intervening elements are present. In addition, unless explicitly described to the contrary, the word "comprise" and variations such as "comprises" or "comprising," will be understood to imply the inclusion of stated elements but not the exclusion of any other elements. Meanwhile, other expressions describing relationships between components such as "between", "immediately between" or "adjacent to" and "directly adjacent to" may be construed similarly.

Singular forms "a", "an" and "the" in the present disclosure are intended to include the plural forms as well, unless the context clearly indicates otherwise. It will be further understood that terms such as "including" or "having," etc., are intended to indicate the existence of the features, numbers, operations, actions, components, parts, or combinations thereof disclosed in the specification, and are not intended to preclude the possibility that one or more other features, numbers, operations, actions, components, parts, or combinations thereof may exist or may be added.

Identification letters (e.g., a, b, c, etc.) in respective steps are used for the sake of explanation and do not describe order of respective steps. The respective steps may be changed from a mentioned order unless specifically mentioned in context. Namely, respective steps may be performed in the same order as described, may be substantially simultaneously performed, or may be performed in reverse order.

The terms used in the present application are merely used to describe particular embodiments, and are not intended to limit the present disclosure. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted to have the meanings equal to the contextual meanings in the relevant field of art, and are not to be interpreted to have ideal or excessively formal meanings unless clearly defined in the present application.

FIG. 1 is a diagram illustrating a server load monitoring system according to one embodiment of the present disclosure.

Referring to FIG. 1, a server load monitoring system 100 includes at least one monitoring target servers 110 and a server load monitoring apparatus 120.

At least one monitoring target servers 110 may be connected with the server load monitoring apparatus 120 and in one embodiment, at least one monitoring target servers 110 may receive a transmission request of a server load value from the server load monitoring apparatus 120. When at least one monitoring target servers 110 receive the transmission request of the server load value from the server load monitoring apparatus 120, at least one monitoring target servers 110 may transmit the server load value during a monitoring period which may be defined as being from a reference time to a past specific time to the server load monitoring apparatus 120.

The server load monitoring apparatus 120 corresponds to a computing apparatus connected with at least one monitoring target servers 110, and may be embodied in a desk top, a notebook, a tablet PC or a smart phone, for example. The server load monitoring apparatus 120 may measure a server load during a monitoring period defined as being from a reference time to a past specific time for each of the at least one monitoring target servers 110 and determine a management policy according to a measured result.

Figure 2:
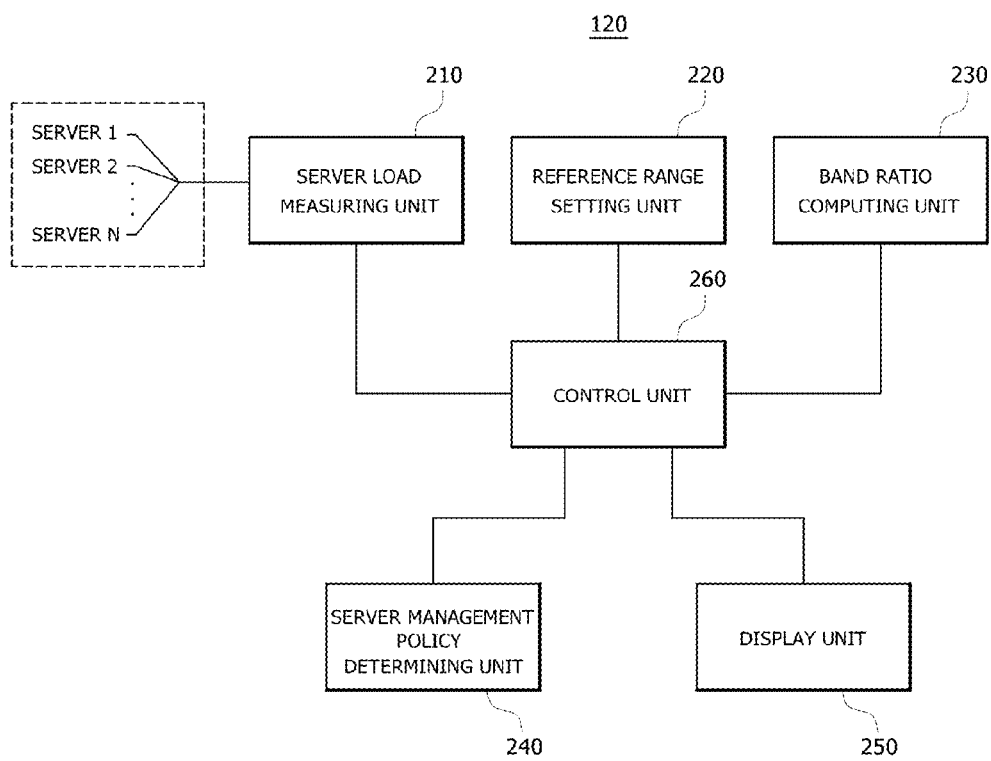
FIG. 2 is a block diagram illustrating a server load monitoring apparatus in FIG. 1.

FIG. 2 is a block diagram illustrating a server load monitoring apparatus in FIG. 1.

Referring to FIG. 2, the server load monitoring apparatus 120 includes a server load measuring unit 210, a reference range setting unit 220, a band ratio calculating unit 230, a server management policy determining unit 240, a display unit 250 and a control unit 260.

Figure 4:
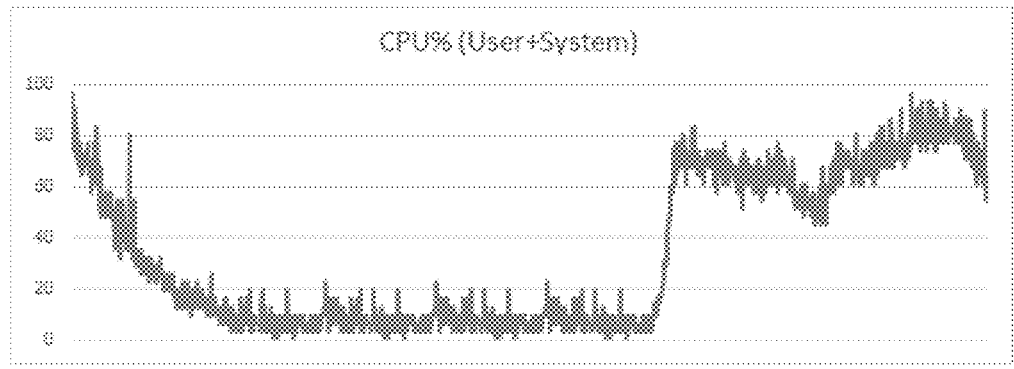
FIG. 4 is a diagram illustrating a server load value of at least one monitoring target server in FIG. 1 during a specific period.

FIG. 4 is a diagram illustrating a server load value of at least one monitoring target server in FIG. 1 during a specific period.

In FIG. 4, the server load measuring unit 210 may receive a server load value during a monitoring period which may be defined as being from a reference time to a past specific time from at least one monitoring target servers 110. The server load measuring unit 210 measures an average server load value and a maximum server load value based on the server load value during a received specific monitoring period.

In one embodiment, the server load measuring unit 210 may determine a priority of at least one monitoring target servers 110 based on a difference between the average server load value and the maximum server load value. More specifically, the server load measuring unit 210 may compare the average server load values for the at least one monitoring target servers 110 to decide that the more the average server load value is, the more load is applied to the server. Also, the server load measuring unit 210 may decide that the more precise server monitoring is needed as the difference between the average server load value and the maximum load value becomes high. For example, when the first monitoring target server 110a has an average server load value of 34.16% and a maximum server load value of 96.77%, and a second monitoring target server 110b has an average server load value of 35.30% and a maximum server load value of 50.90%, the maximum server load value of the first monitoring target server 110a is two times or more than the average server load value of the first monitoring target server 110a. Therefore, the server load measuring unit 210 may decide that the first monitoring target server 110a needs to be monitored in server load more than the second monitoring target server 110b.

The reference range setting unit 220 may set a range of a server performance guide reference based on the average server load value and the maximum server load value of at least one monitoring servers 110 that are estimated from the server load measuring unit 210. More specifically, the reference range setting unit 220 may set the server performance guide reference range as 90% based on the maximum server load value of 96.77% when the first monitoring target server 110a has the largest maximum server load value compared to those of all of other servers. In one embodiment, the reference range setting unit 220 may directly receive the server performance guide range from a user to set. Also, the reference range setting unit 220 may set the number of the set server performance guide reference range. More specifically, the reference range setting unit 220 may receive the difference and the number of the performance guide range from a user. In one embodiment, the difference of the performance guide range indicates the difference from a preset performance guide reference range and the number indicates the number of the performance guide reference. For example, when the performance guide reference range is set as 90%, the difference of the performance guide range is inputted as 5 and the number is inputted as 3, the number of the performance guide reference may be set as 3 and the performance guide reference may be set as 90%, 85% and 80%.

Figure 5:
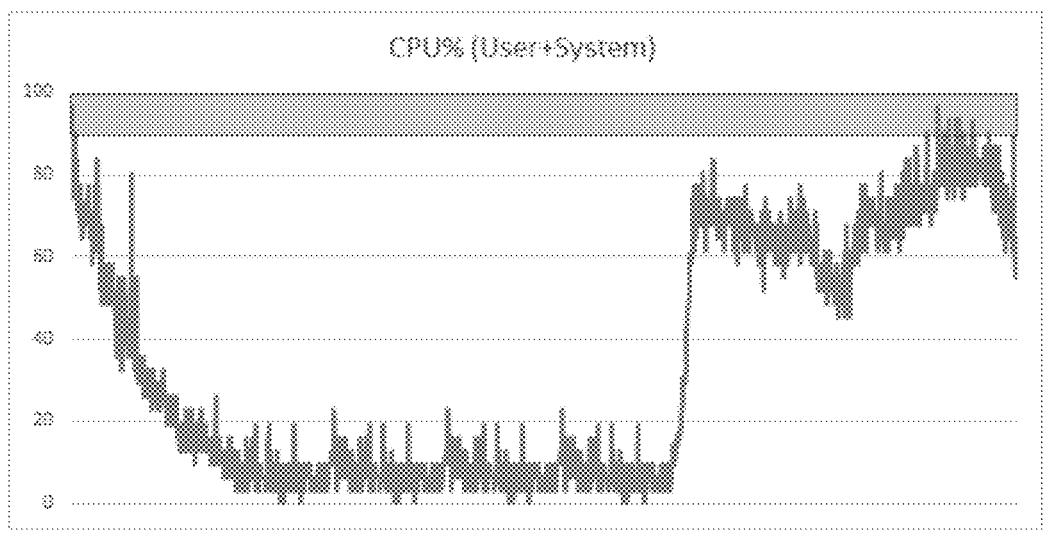
FIG. 5 is a diagram illustrating a process to obtain a band ratio from a server load value in FIG. 4.

FIG. 5 is a diagram illustrating a process to obtain a band ratio from a server load value in FIG. 4.

In FIG. 5, the band ratio calculating unit 230 may calculate a band ratio indicating an over performance guide frequency to sampling frequency ratio for a monitoring period based on a server performance guide reference and its number.

The band ratio may be determined on the following equation.

$$R = \frac{n - c_{eff}}{T} * 100 \quad \text{[Equation 1]}$$

Here, R indicates the band ratio, n indicates the number of an over performance guide frequency in a period range, cell indicates the number of invalid data in the over performance guide frequency data and T indicates the number of total collection in the period range. More specifically, when a set performance guide reference is 90%, n indicates the number stored in 90% or more. The method determining c corresponding to the number of invalid data in the over performance guide data will be described in an equation 2.

The band ratio calculating unit 230 may respectively calculate the band ratio corresponding to the performance guide set from at least one monitoring target servers 110. In one embodiment, the band ratio calculating unit 230 may calculate the band ratio for each of the performance guide reference range set from the reference range setting unit 220. For example, when the set performance guide reference ranges are 90%, 85% and 80%, the band ratio calculating unit 230 may respectively calculate the band ratio corresponding to 90%, the band ratio corresponding to 85% and the band ratio corresponding to 80%.

Figure 6:
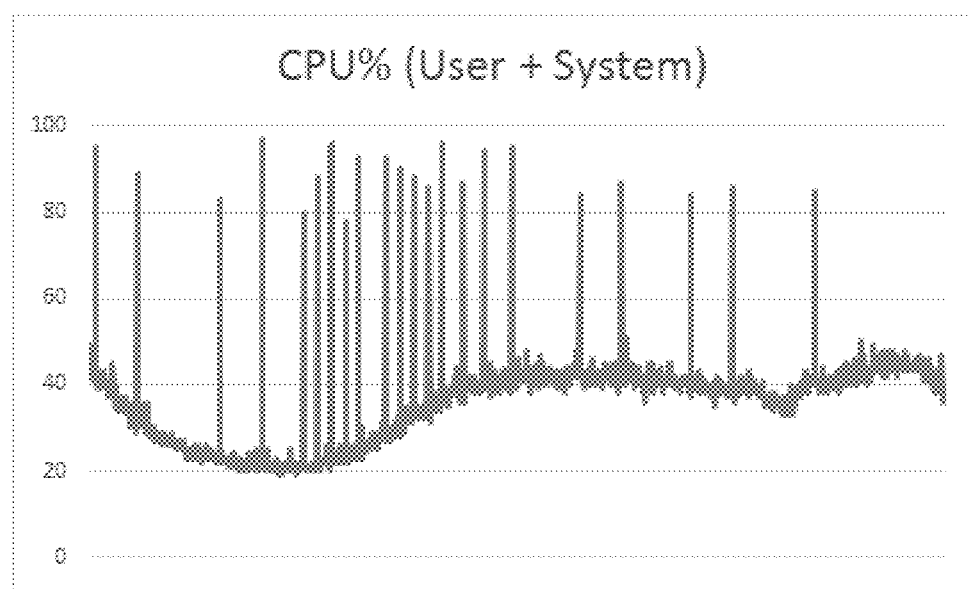
FIG. 6 is a diagram illustrating a process to determine an effectiveness of measured data.

FIG. 6 is a diagram illustrating a process to determine an effectiveness of measured data.

In FIG. 6, when a server load value shows instantaneously high utilization rate in a short time and is not high like an immediately previous one, the band ratio calculating unit 230 may treat such data as invalid data not to include them when calculating the band ratio since there may be a distortion in the band ratio.

In one embodiment, the band ratio calculating unit 230 may calculate differences between the data corresponding to an over performance guide frequency value and the data immediately before the data corresponding to an over performance guide value and between the data corresponding to an over performance guide value and the data immediately after the data corresponding to an over performance guide value, to determine that the differences are valid when the differences are below a specific difference. Such process may be determined on the following equation 2.

$$c_{eff} = \left[\frac{1}{K}s|T_n - T_{n-1}|\right] * \left[\frac{1}{K}s|T_n - T_{n+1}|\right] \quad \text{[Equation 2]}$$

Here, $c_{eff}$ indicates the number of invalid data in the over performance guide frequency data, $T_n$ is reference data corresponding to the over performance guide frequency value, $T_{n+1}$ and $T_{-1}$ data is immediately before and after the reference data and K is a reference constant. In one embodiment, the band ratio calculating unit 230 may determine the reference data as the valid data when the result of $c_{eff}$ of the equation is 0 and determine as the invalid data when the result of $c_{eff}$ of the equation is 1 or more. More specifically, when the reference constant is set as 50, $T_n$ corresponding to the reference data is measured as 97 and the data immediately before and after the reference data are measured as 41 and 37, $c_{eff}$ is 1. Therefore, the band ratio calculating unit 230 may determine the reference data as the invalid data. When the value of $c_{eff}$ is outputted as 1 or more, the band ratio calculating unit 230 may increase c corresponding to the number of the invalid data in the equation 1 as much as 1. The finally counted c indicates the total number of the invalid data. The band ratio calculating unit 230 may exclude the number of the invalid data when calculating the band ratio to calculate an accurate band ratio.

In one embodiment, the band ratio calculating unit 230 may set a minimum value of the over performance guide frequency and measure an effectiveness of excess data according to whether the set minimum value is exceeded. For example, the minimum value of the over performance guide frequency may be set as the value corresponding to 0.1% of the total collection number in period range.

The band ratio calculating unit 230 may calculate a band average that is an average value of the data corresponding to the over performance guide frequency value. In one embodiment, the band ratio calculating unit 230 may calculate the band average based on the over performance guide data determined as the valid value.

Figure 7:
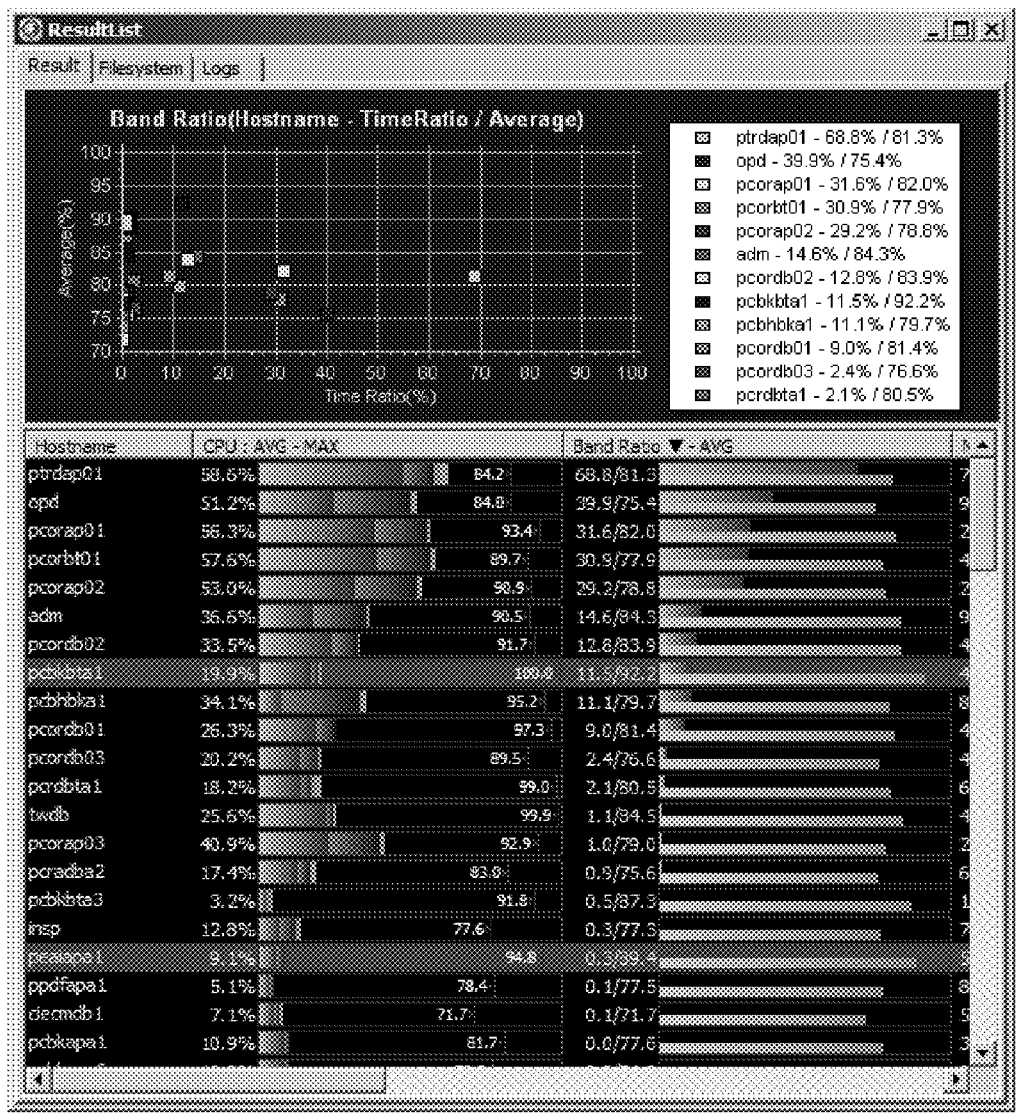
FIG. 7 is a diagram illustrating a calculated band ratio and a band average in a single graph.

FIG. 7 is a diagram illustrating a calculated band ratio and a band average in a single graph.

In FIG. 7, the band ratio calculating unit 230 may indicate a calculated band ratio and a band average in a single graph. The band ratio calculating unit 230 may prepare the graph based on the band ratio and the band average for each server as illustrated in the upper left side of FIG. 7. In the bottom of FIG. 7, the band ratio calculating unit 230 may enumerate the band ratio of each server in a descending order. In one embodiment, the band ratio calculating unit 230 may determine a performance ranking for each server based on the calculated band ratio.

The server management policy determining unit 240 may determine a server management policy for each of at least one monitoring target servers 110 based on an average server load value, a maximum server load value and a band ratio. In one embodiment, the server management policy determining unit 240 may classify the server management policy into a plurality of grades based on the average server load value, the maximum server load value and the band ratio corresponding to the performance guide. For example, the server management policy determining unit 240 may classify the management policy into 5 grades as indicated in the following table.

TABLE 1

| Grade | Band Ratio Range | Note |
|---|---|---|
| 1st grade | Under 1% | Normal |
| 2nd grade | 1% or more and less than 5% | Safe state |
| 3rd grade | 5% or more and less than 10% | Need for confirmation |
| 4th grade | 10% or more and less than 30% | Caution |
| 5th grade | 30% or more | Capacity problem expected |

In one embodiment, the server management policy determining unit 240 may select the grade corresponding to the band ratio from the plurality of grades, and determine the final server management policy based on the selected performance guide grade. For example, when the band ratio of the first monitoring target server 110a is determined as 6.7%, the server management policy determining unit 240 may determine the grade of the first monitoring target server 110a as 3rd grade and it is determined that the first monitoring target server 110 a needs for a confirmation. The server management policy determining unit 240 helps the user to efficiently manage the plurality of servers through a grade determining process.

The display unit 250 may display a result of the server load monitoring through the server load monitoring apparatus 120. In one embodiment, the display unit 250 may be embodied in the display of monitor, tablet PC or smart phone.

The control unit 260 may control the general operation of the server load monitoring apparatus 120 and control a control or data flow among the server load measuring unit 210, the reference range determining unit 220, the band ratio calculating unit 230, the server management policy determining unit 240 and the display unit 250. In one embodiment, the control unit 260 may be embodied in a CPU of the server load monitoring apparatus 120.

Figure 3:
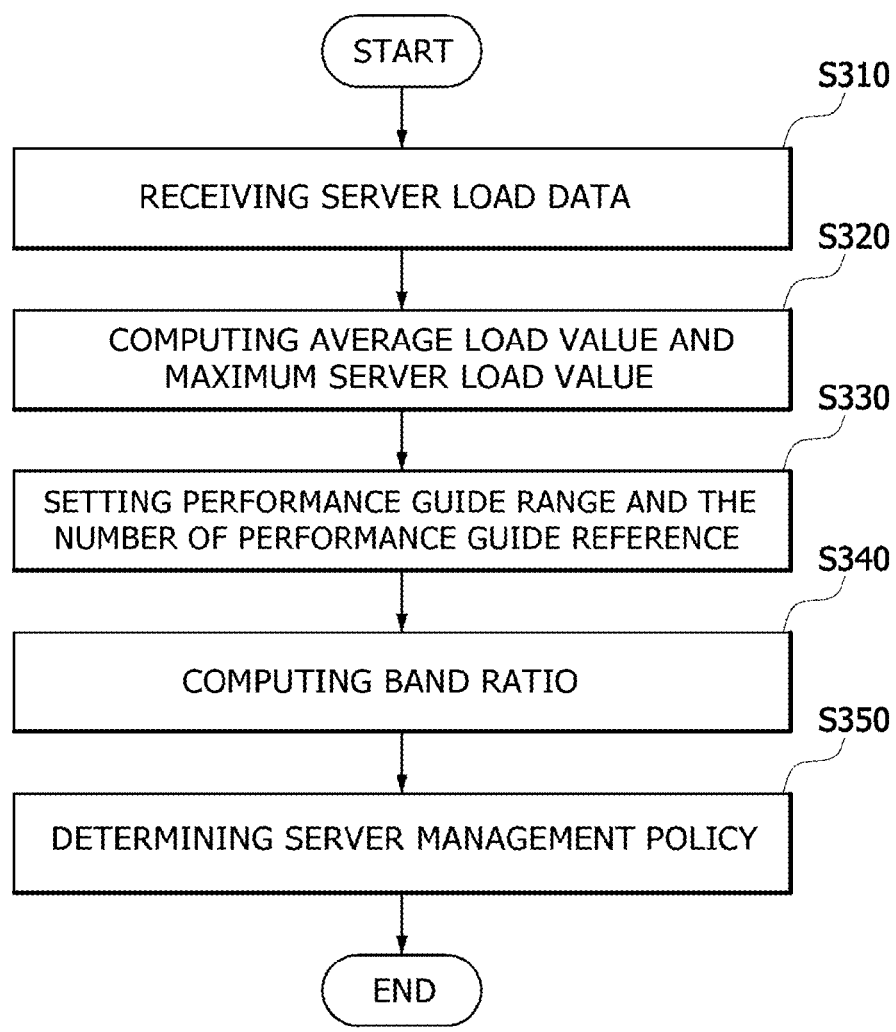
FIG. 3 is a flow chart illustrating a server load monitoring method which is performed by a server load monitoring apparatus in FIG. 1.

FIG. 3 is a flow chart illustrating a server load monitoring method which is performed by a server load monitoring apparatus in FIG. 1.

Referring to FIG. 3, the server load monitoring apparatus 120 receives server load data from at least one monitoring target servers 110 (step S310). When the server load data is received, the server load monitoring apparatus 120 calculates the average server load value and the maximum server load value based on each of server load data (step S320). The server load monitoring apparatus 120 may set the performance guide range and the number of the performance guide reference based on calculated average server load value and the maximum server load value (step S330). Here, when it is assumed that the first monitoring target server 110 a has the largest server load value compared to all of other servers, the server load monitoring apparatus 120 may set the server performance guide reference range as 90% based on the maximum server load value of 96.77%. Also, the server load monitoring apparatus 120 may directly receive the server performance guide range from a user to set and set the number of the set server performance guide reference range. The server load monitoring apparatus 120 may calculate the band ratio for each server based on the number and the range of the set performance guide reference (step S340). The server load monitoring apparatus 120 may determine the server management policy for each server based on the average server load value, the maximum server load value and the band ratio (step S350).

Although this document provides descriptions of preferred embodiments of the present disclosure, it would be understood by those skilled in the art that the present disclosure can be modified or changed in various ways without departing from the technical principles and scope defined by the appended claims.

What is claimed is:

1. A computer-executable server load monitoring method, which is performed in a server load monitoring apparatus connected with at least one server, the method comprising:
   receiving, from the at least one server, server load values of the at least one server during a monitoring period defined from a reference time to a past specific time;
   measuring an average server load value and a maximum server load value of the server load values of the at least one server during the monitoring period defined from the reference time to the past specific time for each of the at least one server;
   calculating a band ratio indicating an over performance guide frequency to sampling frequency ratio for the monitoring period, based on a server performance guide;
   classifying a server management policy into a plurality of grades based on the average server load value, the maximum server load value, and the band ratio corresponding to the server performance guide;
   selecting a grade corresponding to the band ratio from among the plurality of grades;
   determining, for the at least one server, a final server management policy having a grade classified thereto corresponding to the selected grade; and
   displaying the final server management policy.

2. The method of claim 1, wherein the measuring further includes determining a monitoring priority of the at least one server in a descending order of the average server load value.

3. The method of claim 2, wherein the measuring further includes comparing differences between the average server load value and the maximum server load value to determine the monitoring priority.

4. The method of claim 1, wherein the calculating further includes setting a number and a reference range of a server performance guide reference, based on the average server load value and the maximum server load value.

5. The method of claim 1, wherein the calculating further includes setting a minimum value of the over performance guide frequency for determining an effectiveness of excess data.

6. The method of claim 5, wherein the calculating further includes determining the effectiveness of the excess data according to whether the over performance guide frequency exceeds the set minimum value.

7. The method of claim 1, wherein the calculating further includes determining the band ratio according to the following equation:

$$R = \frac{n - c_{\mathit{eff}}}{T} * 100 \qquad \text{[Equation 1]}$$

(R: band ratio, n: a number of the over performance guide frequency in a range of the monitoring period, $c_{\mathit{eff}}$: a number of invalid data in over performance guide frequency data, T: a number of total collection in the range of the monitoring period).

8. The method of claim 1, wherein the calculating further includes respectively calculating band ratios of selected at least one specific server, the band ratios corresponding to the server performance guide.

9. The method of claim 1, wherein the calculating further includes calculating differences between data immediately before data corresponding to an over performance guide frequency value and the data corresponding to the over performance guide frequency value, and between data immediately after the data corresponding to the over performance guide frequency value and the data corresponding to the over performance guide frequency value, to determine that the differences are valid when the differences are below a specific difference.

10. The method of claim 9, wherein the calculating further includes determining the differences are valid according to the following equation:

$$c_{\mathit{eff}} = \left[\frac{1}{K}s|T_n - T_{n-1}|\right] * \left[\frac{1}{K}s|T_n - T_{n+1}|\right] \qquad \text{[Equation 2]}$$

($c_{eff}$: a number of invalid data in over performance guide frequency data, $T_n$: reference data, $T_{n+1}$, $T_{n-1}$: data immediately before and after the reference data, K: reference constant).

11. The method of claim 10, wherein the calculating further includes determining the reference data as valid data when a result of the differences determination is 0 and determining the reference data as the invalid data when the result of the differences determination is 1 or more.

12. The method of claim 10, wherein the calculating further includes counting a number of the invalid data based on the equation 2 to exclude the number of the invalid data when calculating the band ratio.

13. The method of claim 1, wherein the calculating further includes calculating a band average corresponding to an average value for over performance guide frequency data.

14. The method of claim 13, further comprising:
indicating the calculated band ratio and the calculated band average in a single graph.

15. The method of claim 14, wherein the calculating further includes determining a performance ranking for each server based on the calculated band ratio.

16. A server load monitoring apparatus, comprising:
a server load measuring unit configured to
  receive, from at least one server, server load values of the at least one server during a monitoring period defined from a reference time to a past specific time,
  measure an average server load value and a maximum server load value of the server load values of the at least one server during the monitoring period defined from the reference time to the past specific time for each of the at least one server;
a band ratio calculating unit configured to calculate a band ratio indicating an over performance guide frequency to sampling frequency ratio for the monitoring period, based on a server performance guide;
a server management policy determining unit configured to
  classify a server management policy into a plurality of grades based on the average server load value, the maximum server load value, and the band ratio corresponding to the server performance guide,
  select a grade corresponding to the band ratio from among the plurality of grades, and
  determine, for the at least one server, a final server management policy having a grade classified thereto corresponding to the selected grade; and
a display configured to display the final server management policy,
wherein the server load measuring unit, the band ratio calculating unit, and the server management policy determining unit are each implemented via at least one processor.

17. In a non-transitory storage medium that stores a computer-executable server load monitoring method performed in a server load monitoring apparatus which is connected with at least one server, the computer-executable server load monitoring method comprising:
receiving, from the at least one server, server load values of the at least one server during a monitoring period defined from a reference time to a past specific time;
measuring an average server load value and a maximum server load value of the server load values of the at least one server during the monitoring period defined from the reference time to the past specific time for each of the at least one server;
calculating a band ratio indicating an over performance guide frequency to sampling frequency ratio for the monitoring period, based on a server performance guide;
classifying a server management policy into a plurality of grades based on the average server load value, the maximum server load value, and the band ratio corresponding to the server performance guide;
selecting a grade corresponding to the band ratio from among the plurality of grades;
determining, for the at least one server, a final server management policy having a grade classified thereto corresponding to the selected grade; and
displaying the final server management policy.

* * * * *